(12) United States Patent
Santini

(10) Patent No.: US 8,844,879 B2
(45) Date of Patent: Sep. 30, 2014

(54) WING VARIABLE CAMBER TRAILING EDGE TIP

(75) Inventor: Gregory M. Santini, Bothell, WA (US)

(73) Assignee: The Boeing Company, Chicago, IL (US)

( * ) Notice: Subject to any disclaimer, the term of this patent is extended or adjusted under 35 U.S.C. 154(b) by 254 days.

(21) Appl. No.: 13/323,524

(22) Filed: Dec. 12, 2011

(65) Prior Publication Data

US 2013/0146717 A1 Jun. 13, 2013

(51) Int. Cl.
*B64C 3/44* (2006.01)

(52) U.S. Cl.
USPC ............ 244/219; 244/215; 244/218; 244/198

(58) Field of Classification Search
USPC ................ 244/198, 199.1, 213–217
See application file for complete search history.

(56) References Cited

U.S. PATENT DOCUMENTS

| | | | | |
|---|---|---|---|---|
| 3,361,386 A | * | 1/1968 | Smith ......................... | 244/12.1 |
| 4,012,013 A | * | 3/1977 | Ball et al. .................... | 244/53 B |
| 4,053,124 A | * | 10/1977 | Cole ............................ | 244/219 |
| 4,296,900 A | * | 10/1981 | Krall ............................ | 244/219 |
| 4,341,764 A | * | 7/1982 | Wallace et al. ................ | 514/9.3 |
| 6,644,599 B2 | * | 11/2003 | Perez ............................ | 244/219 |
| 7,740,206 B2 | | 6/2010 | Eaton et al. | |
| 2010/0224734 A1 | * | 9/2010 | Grip ............................ | 244/219 |
| 2011/0017876 A1 | * | 1/2011 | Manley et al. ................ | 244/219 |
| 2011/0042524 A1 | * | 2/2011 | Hemmelgarn et al. ....... | 244/203 |

OTHER PUBLICATIONS

Cavenaugh, Michael A. et al, Wind Tunnel Test of Gurney Flaps and T-Strips on an NACA 23012Wing, AIAA 2007-4175.

* cited by examiner

*Primary Examiner* — Timothy D Collins
*Assistant Examiner* — Jamie S Stehle
(74) *Attorney, Agent, or Firm* — Felix L. Fischer

(57) ABSTRACT

A flexible tip for integration in a wing trailing edge employs a wing structure rear spar. A flexible upper skin is attached at a forward boundary to the spar and a rigid lower skin is interconnected to the flexible upper skin at a rigid tail piece. At least one actuation link is attached to the rigid tail piece and has a hinge at a forward edge of the rigid lower skin. At least one positioning slider is attached to the hinge which is movable from a neutral position to a first extended position urging the hinge aft for rotation of the rigid lower skin upward and flexing of the flexible upper skin in an upward camber and to a second retracted position urging the hinge forward for rotation of the rigid lower skin downward and flexing of the flexible upper skin in a downward camber.

14 Claims, 13 Drawing Sheets

WING VARIABLE CAMBER TRAILING EDGE TIP

BACKGROUND INFORMATION

1. Field

Embodiments of the disclosure relate generally to the field of aircraft wing design and more particularly to a variable camber tip and actuation mechanism for wing or flap trailing edge.

2. Background

Modern aircraft operate over a wide range of speeds and altitudes which requires modification and control of the aerodynamics of the lifting surfaces of the aircraft. Major changes in lift requirements for take off and landing are accomplished using conventional trailing edge flaps, among other solutions. However, finer adjustments to optimize cruise aerodynamics or assist in optimizing aerodynamics for other flight regimes are not adequately being provided for. Current solutions modify the camber of the wing by extending or retracting the trailing edge flaps a small amount to reduce drag during cruise portions of flight.

Because of the requirements for the flaps to achieve the large lift changes required during take off and landing, the chord of the flaps is a significant portion of the overall wing chord. The flap motion is controlled by a mechanical drive system and has limited deployment capability during cruise flight conditions due to the relatively large chord length of the flap with respect to total wing chord. Further, this small deployment is only effective during limited cruise conditions based on the camber change resulting from the angular displacement of the relatively large chord length of the flap. Spanwise tailoring of the aerodynamic effects is also limited by the span of each flap, i.e. the entire flap spans either move up or down. As with the chord of the flaps, the span of the flaps for achieving the large lift changes required for take off and landing is large and practical limitations in segmenting the flaps due to the requirements for actuation control limits spanwise variation for changes of the overall wing camber.

It is therefore desirable to provide a structural design for a variable camber trailing edge tip.

SUMMARY

Embodiments disclosed herein provide an apparatus for varying the camber of an aircraft wing having a trailing edge connected to the aft end of the wing incorporating a flexible upper surface and a rigid lower surface. At least one slider link is secured at an aft end to the trailing edge rigid lower surface. A bell crank actuating mechanism arranged internally to the wing, forward of said trailing edge is pivotably connected to the forward end of the slider link. When the bellcrank mechanism is actuated, the slider link moves in a forward and aft direction causing the flexible upper surface to bend, selectively varying the wing camber.

In one example embodiment a flexible tip for integration in a wing trailing edge employs a wing structure rear spar. A flexible upper skin is attached at a forward boundary to the spar and a rigid lower skin is interconnected to the flexible upper skin at a rigid tail piece. At least one actuation link is attached to the rigid tail piece and has a hinge at a forward edge of the rigid lower skin. At least one positioning slider is attached to the hinge which is movable from a neutral position to a first extended position urging the hinge aft for rotation of the rigid lower skin upward and flexing of the flexible upper skin in an upward camber and to a second retracted position urging the hinge forward for rotation of the rigid lower skin downward and flexing of the flexible upper skin in a downward camber.

The embodiments provide a method for flexing an integrated flexible tip for a wing structure in which a hinged forward end of a rigid lower skin is moved aft or forward. A reacting force is provided with a flexible upper skin which creates upward rotation of the rigid lower skin about the hinge and flexing the upper skin for upward camber upon aft motion of the hinged forward end and creates downward rotation of the rigid lower skin about the hinge and flexing the upper skin for downward camber upon forward motion of the hinged forward end.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide a structure whereby the trailing edge of a wing can be actuated to move the tip up or down in order to change the camber of wing. This trailing edge tip can be on the fixed aft portion of the wing, or on the aft portion of a flap or aileron. For an example embodiment, the upper surface of the flexing portion of the tip incorporates a flexible skin, while the lower surface of the flexing portion is a substantially rigid skin with associated actuation links. For actuation in the example embodiment, as a lower actuation link is pushed aft, the flexible tip will rotate up to put an upward camber on the wing. As the lower actuation link is pulled forward, the flexible tip will rotate down to put a downward camber on the wing.

Figure 1A:
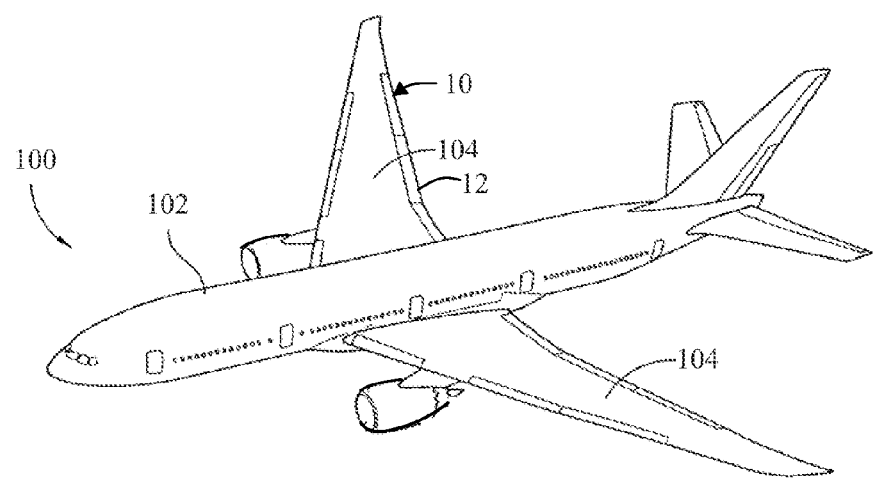
FIG. 1A is an isometric view of an example aircraft on which embodiments disclosed herein may be employed.
Figure 1B:
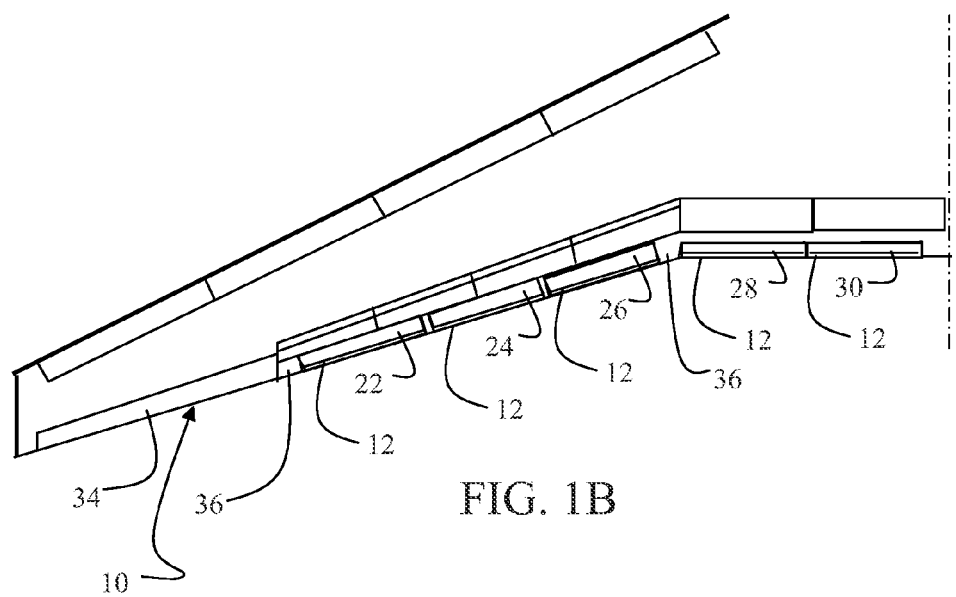
FIG. 1B is a top view of the aircraft wing showing example zones of application for the wing trailing edge tip deflection system.

As shown in FIG. 1A for an aircraft 100 with a fuselage 102 and wings 104 having trailing edges 10, a flexible tip 12 can be incorporated in various portions or zones of the trailing edge of the wing as represented in detail in FIG. 1B. Each section of spanwise flaps or other length or zone, 22, 24, 26, 28 and 30 may incorporate a flexible tip 12 as a separate zone. Each zone may then be separately controlled for upward or downward deflection of the tip with the flap section in any position. While described herein for an example embodiment as associated with the flap sections, the flexible tip may be incorporated on ailerons 34 or fixed wing sections 36 as well.

Figure 2A:
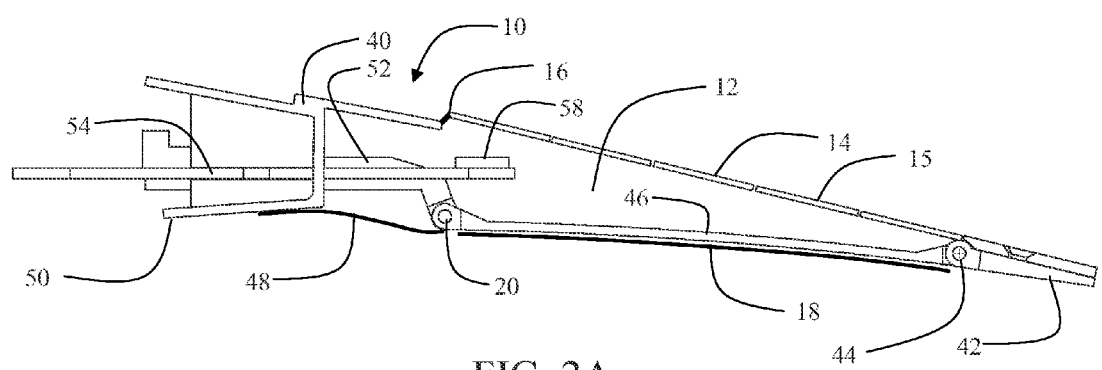
FIG. 2A is side section schematic of an embodiment of a wing trailing edge tip deflection system in the undeflected position.
Figure 2B:
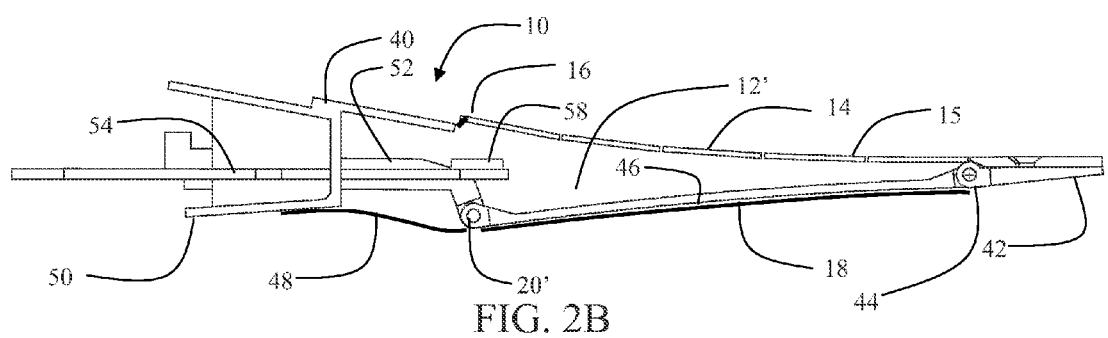
FIG. 2B is a side section schematic of the embodiment of FIG. 2A showing upward deflection.
Figure 2C:
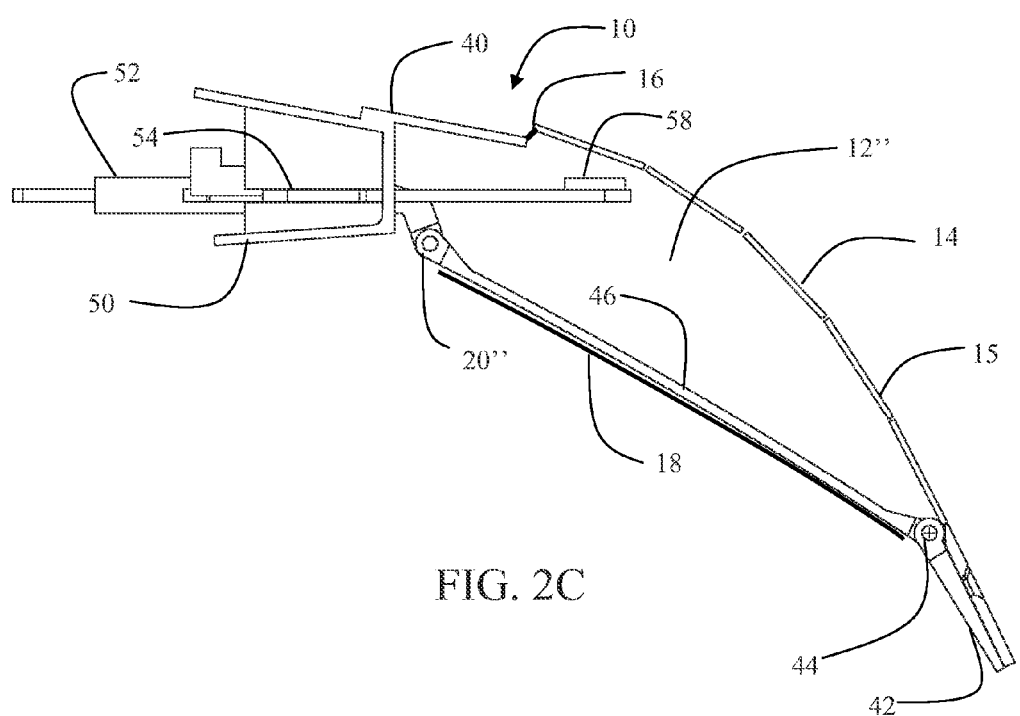
FIG. 2C is a side section schematic of the embodiment of FIG. 2A showing downward deflection.

FIGS. 2A-2D show an example embodiment for wing trailing edge 10 and an integrated flexible tip 12 demonstrating motion from a neutral position shown in FIG. 2A. A flexible upper skin 14 and rigid lower skin 18 form the flexible tip. A forward actuation hinge 20 which is movable forward and rearward for actuation of the flexible tip, as will be described in grater detail subsequently, provides an axis of rotation for the lower skin 18. In an upward flexed condition as shown in FIG. 2B, the upward deflected flexible tip (designated 12') and the flexible upper skin 14 of the tip flex upward anchored at a forward edge 16 and the lower skin 18 retains a rigid shape extending from the actuation hinge (designated 20' in the rearward position). In a downward flexed condition of flexible tip (designated 12") shown in FIG. 2C, the flexible skin 14 flexes downward from the forward edge 16 and the lower skin 18 retains the rigid shape from the actuation hinge (represented as 20" in the forward position).

As shown in FIGS. 2A-2C and FIG. 3, the trailing edge 10 of the wing or flap section is supported by an aft spar 40 or similar structural elements in the wing or flap. The flexible upper skin 14 attaches at the forward edge 16 on the spar 40. The upper skin may incorporate multiple hinged plates or scales 15 to achieve the desired flexibility or may be constructed from a smooth, continuous flexible composite membrane. A rigid tail piece 12 provides a terminating attachment for the upper skin opposite the forward boundary. The lower skin 18 also attaches at an aft extremity to the rigid tail piece 42. For the embodiment shown, a hinge 44 is incorporated at the interface of the rigid tail piece 42 and lower skin for stress relief on the tail piece between the flexing upper skin 14 and rigid lower skin 18 allowing the tail piece to conform to the shape induced by the flexing upper skin 14. Actuation links 46 incorporated in or mounted on an inner surface of the rigid lower skin 18 extend between the actuation hinge 20 and the rigid tail piece for flexing of the tip as will be described in greater detail subsequently. A gap seal 48, such as a flexible blade seal or other device extends between the actuation hinge and the undersurface 50 of the spar 40 as an aerodynamic seal for the various extension/retraction positions of the actuation hinge 20 during flexing of the tip.

Figure 3:
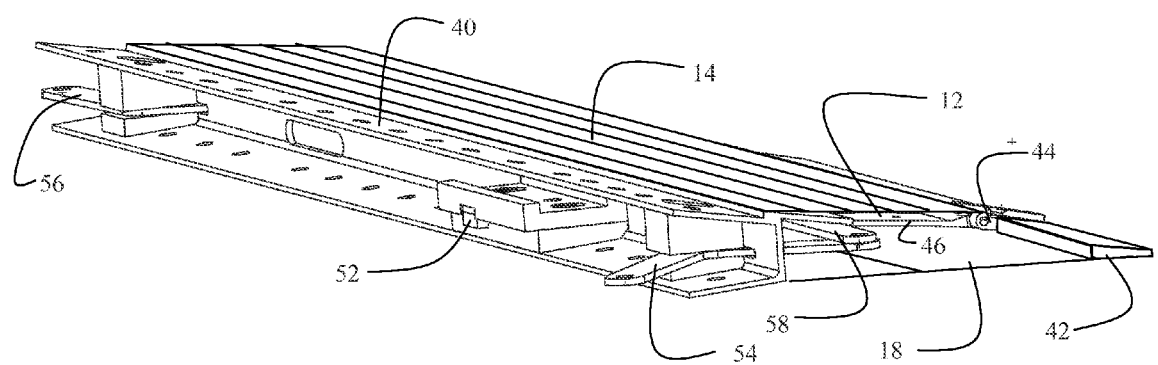
FIG. 3 is an isometric view of mechanical features of a wing trailing edge tip deflection system.
Figure 4A:
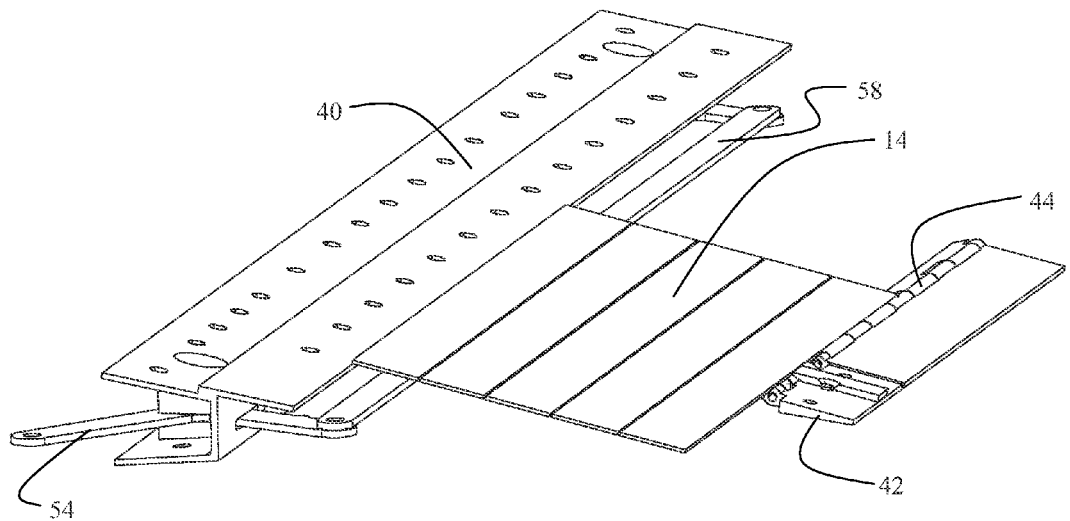
FIG. 4A is an aft isometric view of the wing trailing edge tip deflection system embodiment of FIG. 3 with neutral deflection showing only a portion of the flexible upper skin.
Figure 4B:
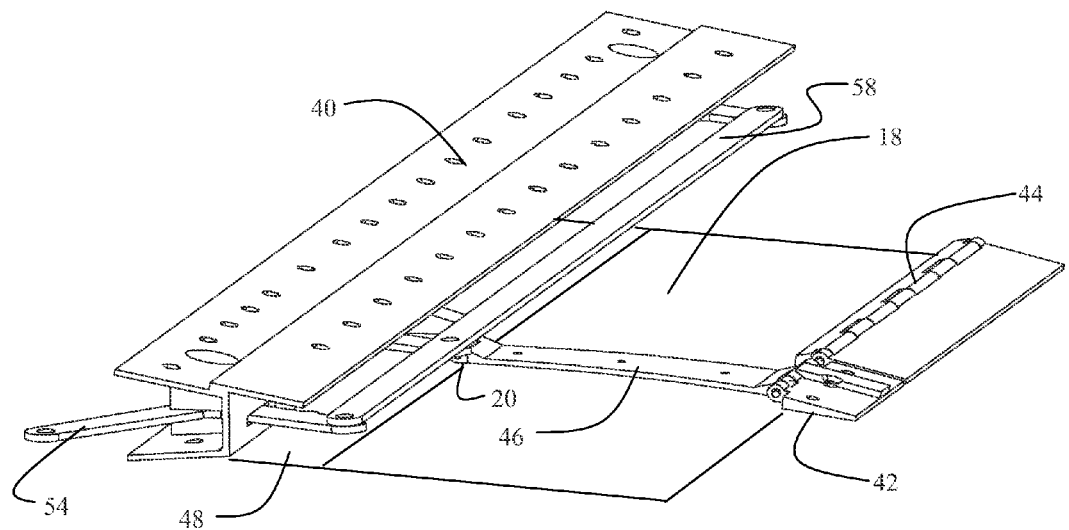
FIG. 4B is an aft isometric view of the wing trailing edge tip deflection system embodiment of FIG. 3 with neutral deflection with the upper flexible skin removed showing the lower skin and actuation link.
Figure 4C:
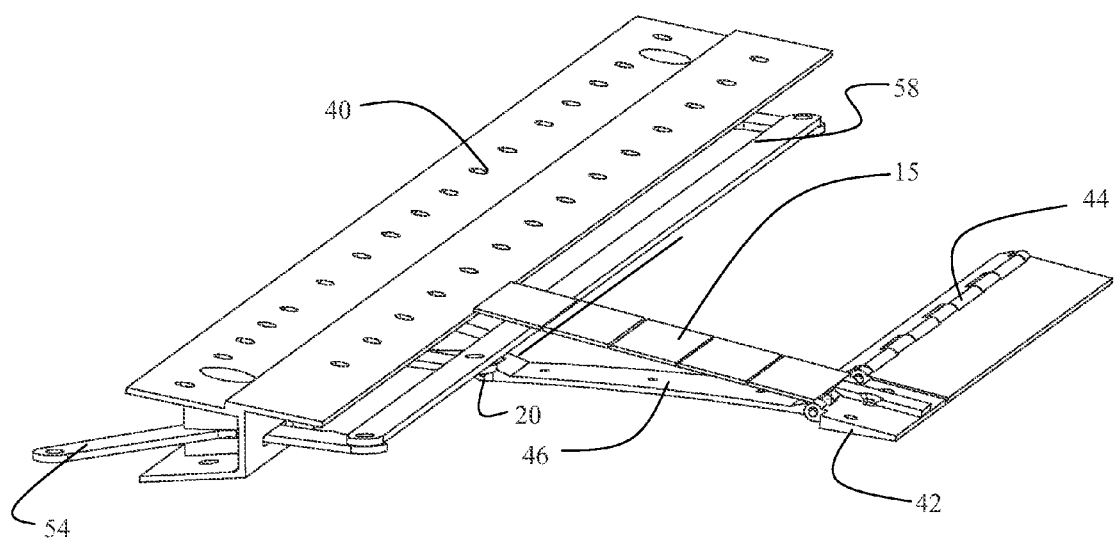
FIG. 4C is an aft isometric view of the wing trailing edge tip deflection system embodiment of FIG. 3 with neutral deflection showing a small spanwise strip of the flexible upper skin for visualization of the relative positioning of the upper skin and actuation link.
Figure 5A:
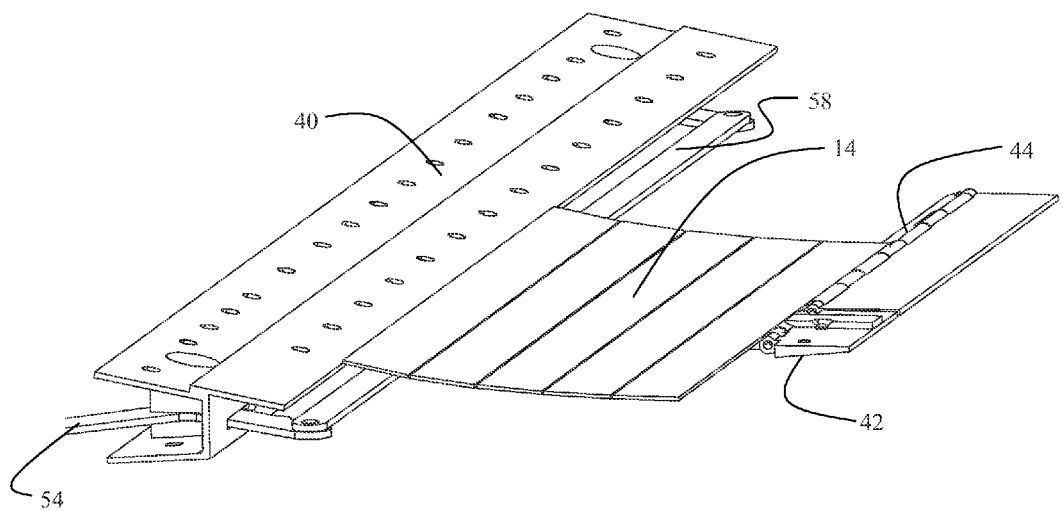
FIG. 5A is an aft isometric view of the wing trailing edge tip deflection system embodiment of FIG. 3 with upward deflection showing only a portion of the flexible upper skin.
Figure 5B:
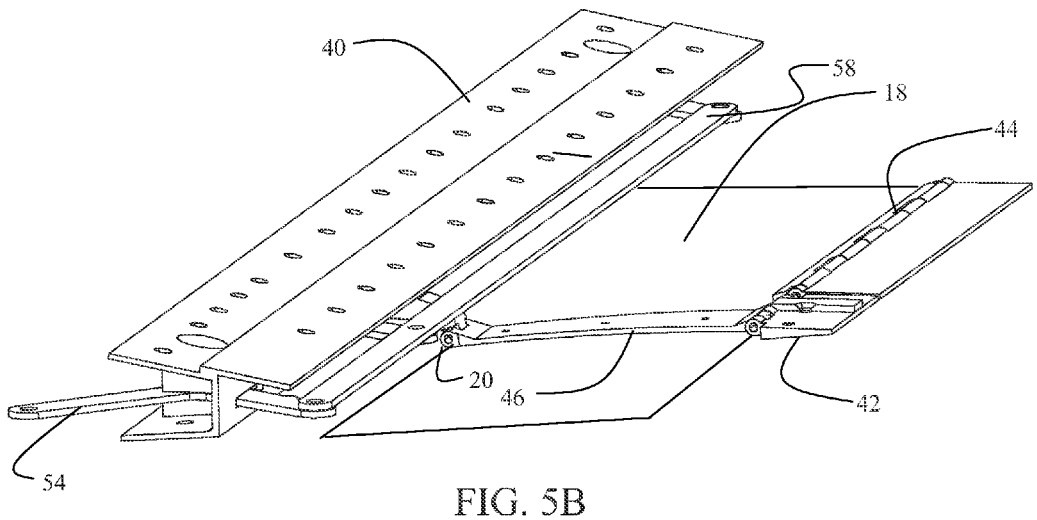
FIG. 5B is an aft isometric view of the wing trailing edge tip deflection system embodiment of FIG. 3 with upward deflection with the flexible upper skin removed showing the lower skin and actuation link.
Figure 5C:
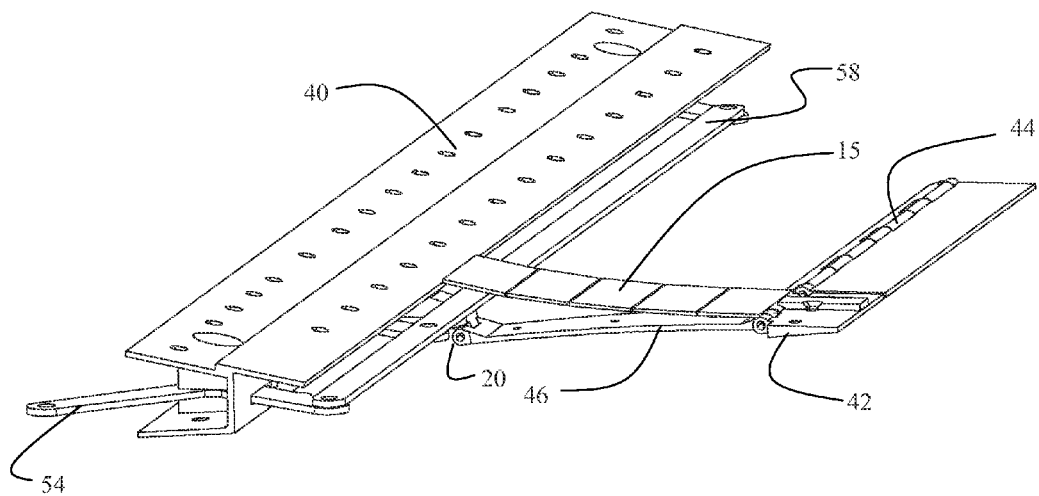
FIG. 5C is an aft isometric view of the wing trailing edge tip deflection system embodiment of FIG. 3 with upward deflection showing a small spanwise strip of the flexible upper skin for visualization of the relative positioning of the upper skin and actuation link.
Figure 6:
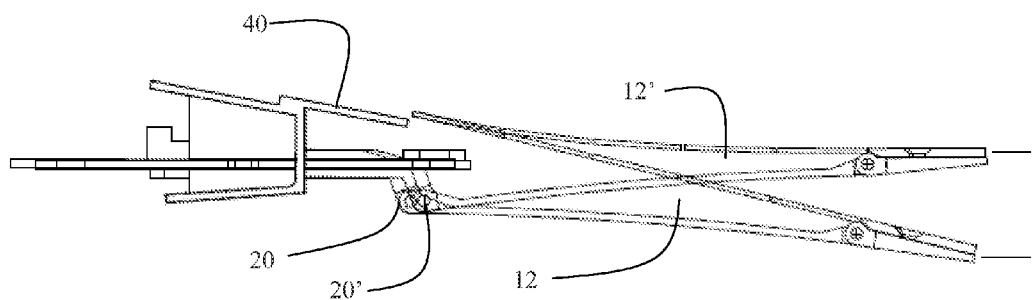
FIG. 6 is a side section view of the wing trailing edge tip deflection system of FIGS. 5A-5C showing relative upward deflection from neutral.
Figure 7A:
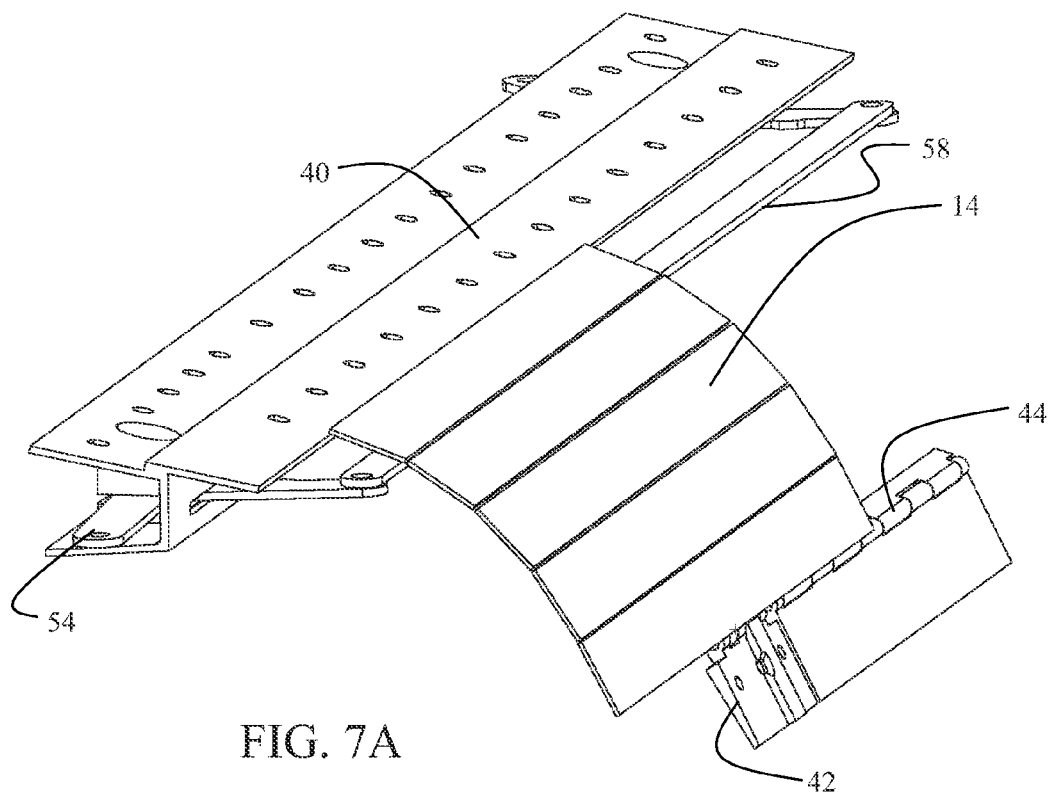
FIG. 7A is an aft isometric view of the wing trailing edge tip deflection system embodiment of FIG. 3 with downward deflection showing only a portion of the flexible upper skin.
Figure 7B:
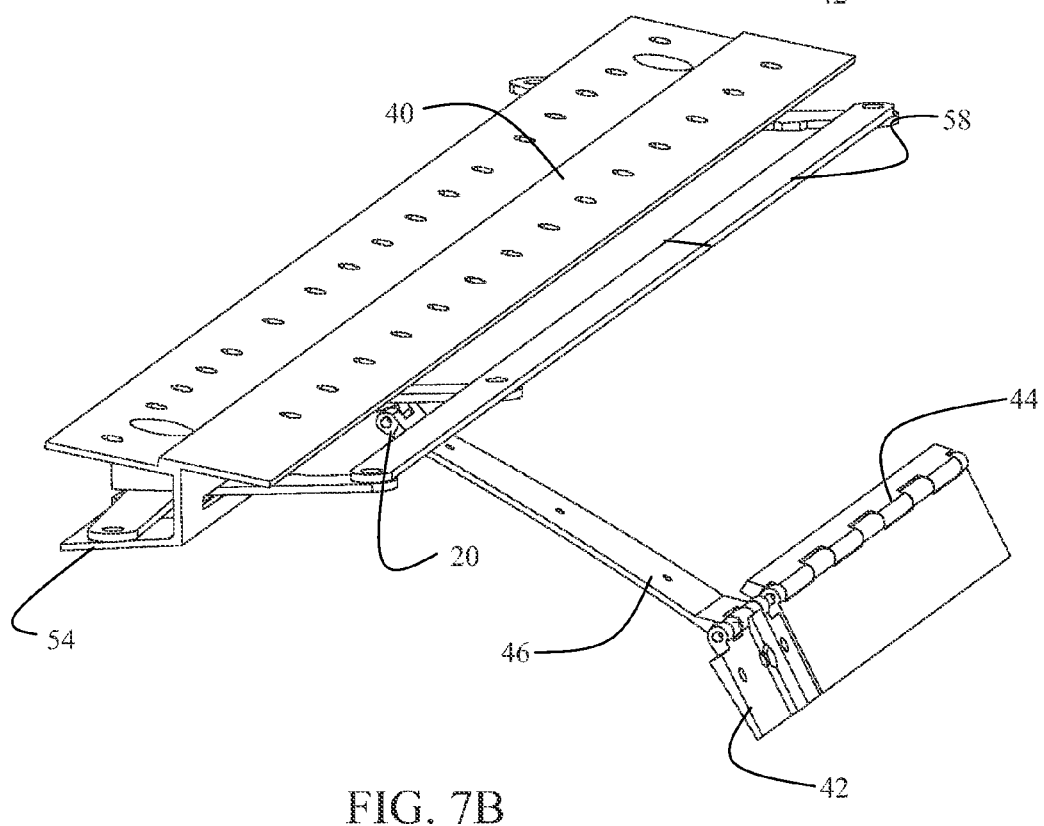
FIG. 7B is an aft isometric view of the wing trailing edge tip deflection system embodiment of FIG. 3 with downward deflection with the flexible upper skin removed showing the lower skin and actuation link.
Figure 7C:
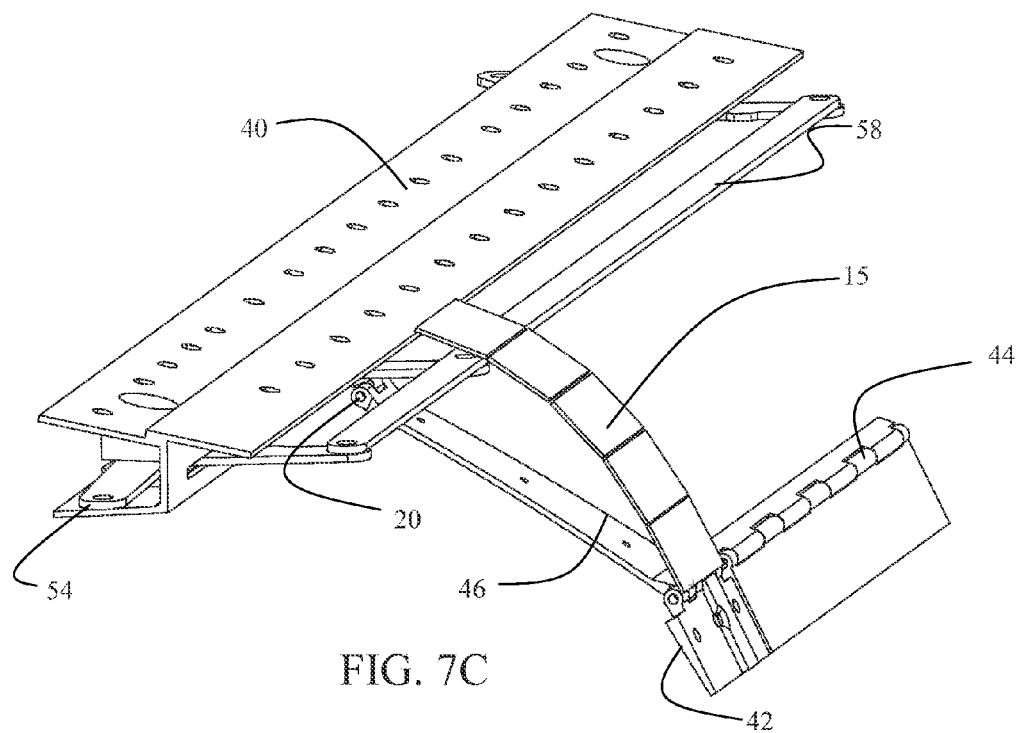
FIG. 7C is an aft isometric view of the wing trailing edge tip deflection system embodiment of FIG. 3 with downward deflection showing a small spanwise strip of the flexible upper skin for visualization of the relative positioning of the upper skin and actuation link.
Figure 8:
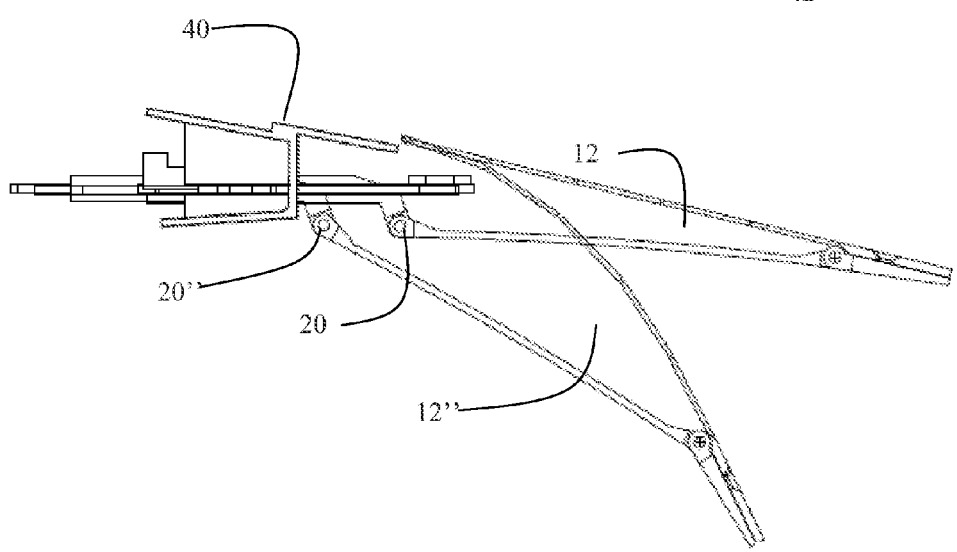
FIG. 8 is a side section view of the wing trailing edge tip deflection system of FIGS. 7A-7C showing relative downward deflection from neutral

FIGS. 4A-4C show the embodiment of FIG. 3 from a rear perspective with FIG. 4A showing the flexible tip 12 with a portion of the flexible upper skin 14. FIG. 4B shows the flexible tip 12 with the upper skin removed to clearly show the lower skin 18 and actuation links 46 attaching to the rigid tail piece 42. FIG. 4C shows the flexible tip 12 with a very small strip of the upper skin 14 shown to demonstrate the relationship between the flexible upper skin and the actuation links 46. Similarly, FIGS. 5A-5C provide the same views with the tip in the upward deflected position with FIG. 6 providing a side view overlay of the undeflected position of the tip 12 and upward deflected position of the tip designated 12'. FIGS. 7A-7C provide the same views as FIGS. 4A-4C with the tip in the downward deflected position with FIG. 8 providing a side view overlay of the undeflected position of the tip 12 and downward deflected position of the tip designated 12".

Figure 2D:
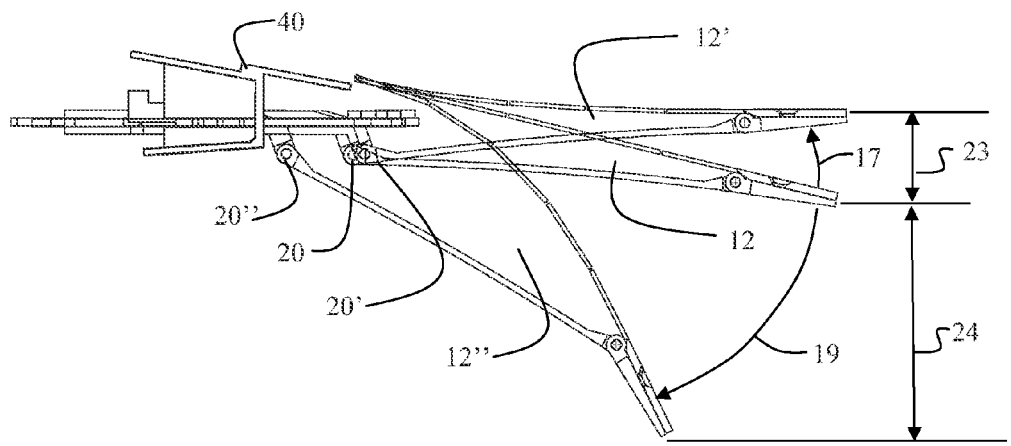
FIG. 2D is a side section schematic of the embodiment of FIG. 2A with an overlay of the undeflected, upward and downward deflection.

Flexible upper skin 14 is fixed in arcuate length but flexible through a range of positive and negative arcs of varying radius relative to the normal position as shown in FIG. 2D. For the example embodiment, the flexible tip 12 has a chord length of approximately 6.5% of total wing chord. Typical flap zones as disclosed with respect to FIG. 1B provide flaps with chord lengths of between approximately 10% and 20% of total wing chord. The flexible tip when incorporated as a portion of the wing flap constitutes between approximately 17% and 33% of the flap chord. The angle subtended by the flexible tip chords may vary from approximately +10° (upward deflection 17) to −55° (downward deflection 19) with a resulting upward deflection 23 at the tip of approximately 1.2% of total wing chord and downward deflection 24 of approximately 2.8% of total wing chord. With respect to the flap, the upward deflection is approximately 6.3% of flap chord and the downward deflection is approximately 14.2% of flap chord. For exemplary embodiments this provides an upward deflection range of between 0 and over 1.0% of total wing chord and between 0 and over 6.0% of flap chord and a downward deflection range of between 0 and over 2.5% of total wing chord and between 0 and over 14% of flap chord. The values presented for the embodiment shown are examples only and may be varied as required for aerodynamic and structural requirements on individual aircraft.

Figure 9:
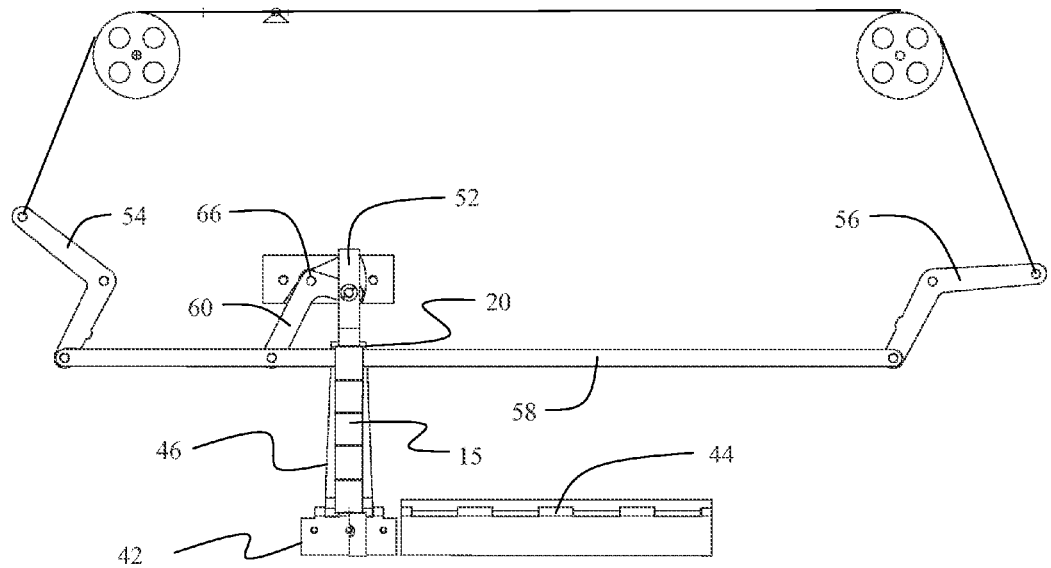
FIG. 9 is a top view of the actuation system elements with the upper skin and supporting spar removed for clarity.

As best seen in FIG. 9 with the upper skin 14 and spar 40 removed, a positioning slider 52 attaches to each of the actuation links 46 to extend the actuation hinge 20 aft or rearward (to position 20') for upwardly flexing the tip as shown in FIGS. 5A-5C and 6 and to retract the actuation hinge 20 forward (to position 20") for downwardly flexing the tip as shown in FIGS. 7A-7C and 8. For an example embodiment, motion of the positioning sliders 52 is induced by a bellcrank mechanism. An extension bellcrank 54 and a retraction bellcrank 56 are interconnected by a connector rod 58. Actuation bellcranks 60 pivotally extend from the connector rod 58 to each positioning slider 52. In FIG. 9 positioning slider 52 and associated actuation link 46 are shown interconnecting the rigid tail piece 42 and actuation hinge 20. In certain applications, a single actuation link may be sufficient and in other applications multiple positioning sliders and actuation links spaced along the wing zones 22, 24, 26, 28 and 30, as previously described with respect to FIG. 1B, may be employed to assure accurate non-binding motion in the flexible tip. Additionally, while a bellcrank actuation system is shown for the example embodiment, the positioning sliders may be operated by rotary actuators or may be incorporated in a linear actuator for movement of the actuation links in alternative embodiments.

Figure 10:
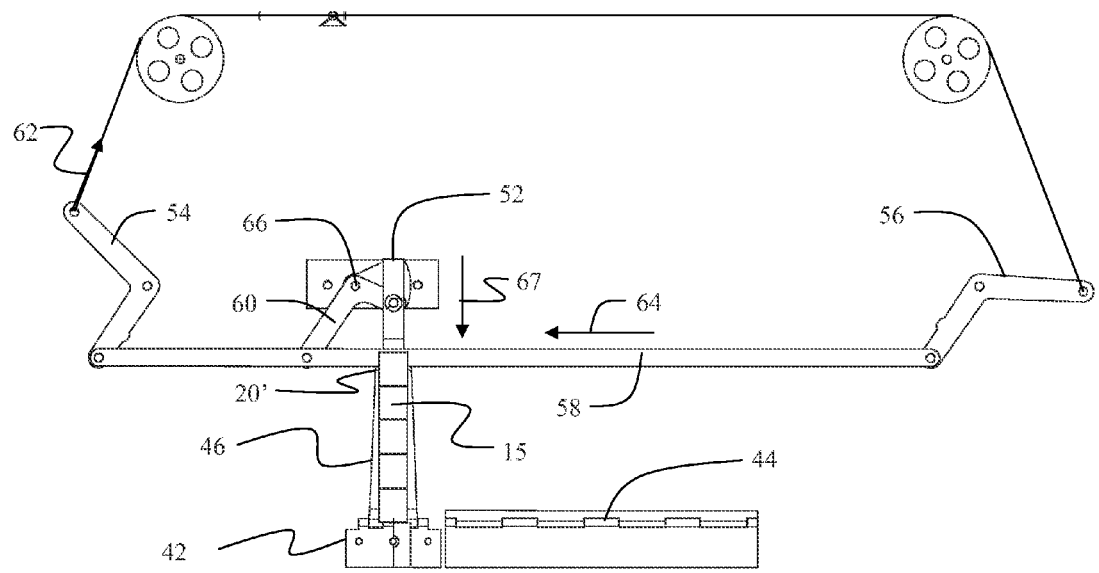
FIG. 10 is a top view of an example actuation system for the embodiment of FIG. 3 showing displacement for upward deflection.

As shown in FIG. 10, rotating the extension bellcrank 54 by applying a force as indicated by arrow 62 draws the connector rod in a first direction indicated by arrow 64 thereby causing actuation bellcranks 60 to rotate around pivot points 66 causing the attached positioning sliders 52 to move aft as shown by arrow 67. Aft motion of the positioning sliders 52 displacing actuation hinge 20 aft causes the actuation links 46 to be urged aft rotating upwardly about actuation hinge 20 due to the force exerted by the upper skin, due to its fixed length, on the interconnecting rigid tail piece 42. The net upward flex of the integrated flexible tip 12 is shown in FIGS. 5A-5C and 6.

Figure 11:
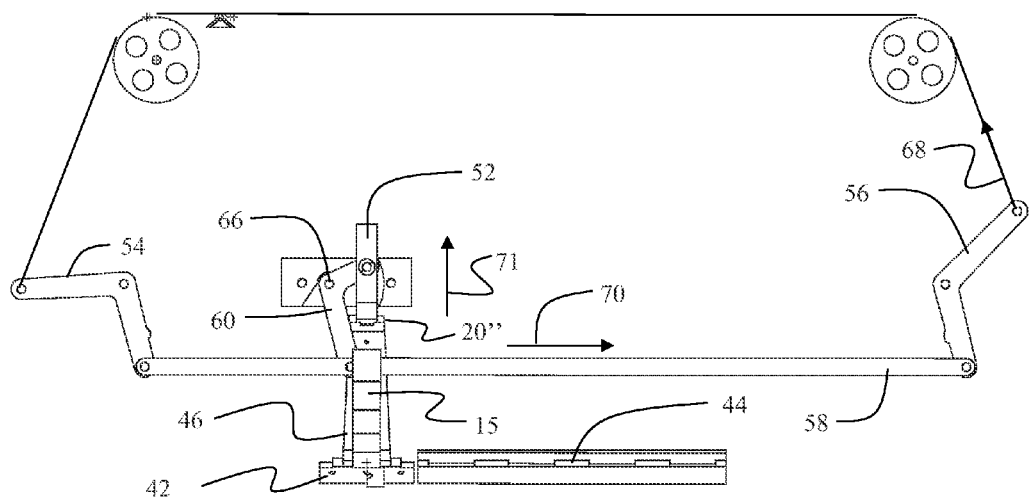
FIG. 11 is a top view of an example actuation system for the embodiment of FIG. 3 showing displacement for downward deflection; and, FIG. 12 is a flow chart depicting operational steps for wing trailing edge tip deflection system control.

Similarly, as shown in FIG. 11, rotating the retraction bellcrank 56 by applying a force as indicated by arrow 68 draws the connector rod in a second direction indicated by arrow 70 causing actuation bellcranks 60 to rotate about pivot points 66 drawing the attached positioning sliders 52 forward as shown by arrow 71. Forward motion of the positioning sliders 52 displacing actuation hinge forward causes the actuation links 46 to be urged forward rotating downwardly about actuation hinge 20. With resisting force due to the fixed length of upper skin 14, the rigid tip additionally rotates downward about hinge 44 as shown in FIGS. 7A-7C and 8.

Figure 12:
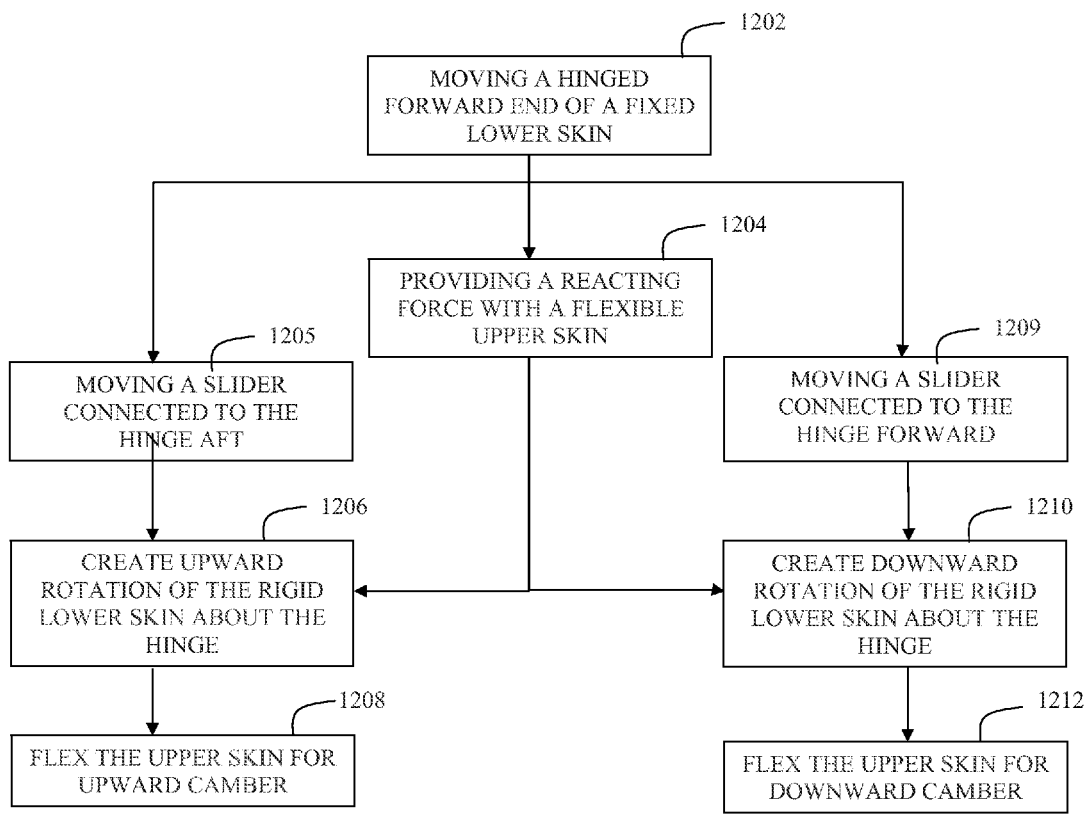

As shown in FIG. 12, flexing of an integrated flexible tip for a wing structure is accomplished by moving a hinged forward end of a fixed lower skin, step 1202. A reacting force is provided with a flexible upper skin, step 1204, which creates upward rotation of the rigid lower skin about the hinge, step 1206, and flexes the upper skin for upward camber, step 1208, upon aft motion of the hinged forward end, or creates downward rotation of the rigid lower skin about the hinge, step 1210 and flexes the upper skin for downward camber, step 1212 upon forward motion of the hinged forward end. Aft motion of the hinged forward end may be accomplished by moving a slider connected to the hinge aft, step 1205, and forward motion of the hinged forward end may be accomplished by moving the slider forward, step 1209. Moving the slider may be accomplished with a bellcrank system employing an actuation bellcrank attached to the slider for rotation by a connector bar which may be displaced by an extension bellcrank or a retraction bellcrank.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An apparatus for varying a camber of an aircraft wing, comprising:
   an aircraft wing;
   a flexible trailing edge connected to an aft end of the wing, said flexible trailing edge comprising;
   a fixed length flexible upper surface;
   a rigid lower surface extending from an actuation hinge;
   at least one actuation link on an inner surface of the rigid lower skin extending between the actuation hinge and a second hinge; and,
   a tail piece connected at the second hinge to the rigid lower surface and interconnecting the flexible upper surface, said tail piece conforming to a shape induced by flexing of the upper surface;
   at least one slider link having forward and aft ends, wherein the aft end of said slider link is secured to the flexible trailing edge rigid lower surface at the hinge;
   a bell crank actuating mechanism arranged internally to the wing, forward of said trailing edge rigid lower surface;
   wherein said bell crank actuating mechanism is pivotably connected to the forward end of the slider link; and
   wherein when the bell crank mechanism is actuated, the slider link moves in a forward and aft direction urging the hinge in a forward and aft direction causing the flexible upper surface to bend, selectively varying the wing camber.

2. The apparatus of claim 1, wherein the bellcrank mechanism is pivotably connected to a plurality of slider links each slider link connected to the actuation hinge on the trailing edge rigid lower surface at selected locations of the trailing edge.

3. The apparatus of claim 1, wherein the bell crank mechanism comprises a connector bar and a plurality of actuation bellcranks equal in number to the plurality of slider links configured to move the slider links in a selectively forward and aft direction.

4. The apparatus of claim 1 wherein deflection for the selectively varied wing camber of the flexible trailing edge is between 0 and 1.2% of total wing chord upward and between 0 and 2.8% of total wing chord downward.

5. The apparatus of claim 1 wherein the flexible trailing edge is connected to a flap on the trailing edge of the wing and deflection for the selectively varied wing camber of the flexible trailing edge is between 0 and 6.3% of flap chord upward and between 0 and over 14% of flap chord downward.

6. The apparatus of claim 5 wherein the flap has a chord of between 10% and 20% of total wing chord and the flexible trailing edge has a chord of between 17% and 33% of flap chord.

7. The apparatus of claim 1 wherein deflection for the selectively varied wing camber of the flexible trailing edge is between +10° and −55°.

8. A flexible tip for integration in a wing trailing edge comprising:
   a wing structure rear spar;
   a fixed length flexible upper skin attached at a forward boundary to the spar;
   a rigid lower skin interconnected to the flexible upper skin at a rigid tail piece;
   at least one actuation link attached to the rigid tail piece and having a hinge at a forward edge of the rigid lower skin;
   at least one positioning slider attached to the hinge, said slider movable from a neutral position to a first extended position urging the hinge aft for rotation of the rigid lower skin upward and flexing of the flexible upper skin in an upward camber and to a second retracted position urging the hinge aft for rotation of the rigid lower skin downward as reacted by flexing of the flexible upper skin in a downward camber.

9. The flexible tip as defined in claim 8 wherein the tail piece is connected at a second hinge to the actuation link and interconnecting the flexible upper surface, said tail piece conforming to a shape induced by flexing of the upper surface.

10. The flexible tip as defined in claim 8 further comprising:

an actuation bellcrank connected to the at least one positioning slider, rotation of the actuation bellcrank positioning the at least one positioning slider between the first extended position and the second retracted position.

11. The flexible tip as defined in claim 10 further comprising:

a connector rod pivotally attached to the actuation bellcrank;

an extension bellcrank pivotally attached to the connector rod; and, a retraction bellcrank pivotally attached to the connector rod.

12. The flexible tip as defined in claim 8 wherein the upward camber has a deflection of between 0 and 1.2% of total wing chord upward and between 0 and 2.8% of total wing chord downward.

13. The flexible tip as defined in claim 8 wherein the wing structure rear spar is connected to a flap on the trailing edge of the wing and the upward camber has a deflection between 0 and 6.3% of flap chord upward and between 0 and over 14% of flap chord downward.

14. The flexible tip as defined in claim 8 wherein the upward and downward camber has a deflection of between +10° and −55°.

* * * * *